United States Patent [19]

Sevrence

[11] 4,337,554
[45] Jul. 6, 1982

[54] STAMPED YOKE END AND METHOD OF MAKING SAME

[75] Inventor: Warren E. Sevrence, Adrian, Mich.

[73] Assignee: Acco Industries Inc., Bridgeport, Conn.

[21] Appl. No.: 111,351

[22] Filed: Jan. 11, 1980

[51] Int. Cl.³ .................. F16G 11/00; B21D 53/58
[52] U.S. Cl. ................................ 24/115 R; 72/379; 24/115 K; 294/78 R
[58] Field of Search .......... 24/115 K, 115 M, 73 CE; 294/78 R; 339/47; 72/379; 29/175 R, 175 A; 113/116 F, 116 H, 116 V, 116 AA, 116 HH, 119; 59/15, 91, 93

[56] References Cited

U.S. PATENT DOCUMENTS

| 830,902 | 9/1906 | Keller | 113/116 H |
|---|---|---|---|
| 1,125,108 | 1/1915 | Johnson. | |
| 1,261,153 | 4/1918 | Needham. | |
| 1,440,998 | 1/1923 | Kadel. | |
| 1,443,518 | 1/1923 | Anderson. | |
| 1,519,467 | 12/1924 | Norris | 192/3.53 |
| 1,619,517 | 3/1927 | Hughes | 339/276 S |
| 1,764,227 | 6/1939 | Robinson | 248/499 |
| 1,835,359 | 12/1931 | Warner | 59/91 |
| 2,643,446 | 6/1953 | Matthysse et al. | 113/119 |
| 2,699,587 | 1/1955 | Elsner | 24/115 K |
| 2,938,329 | 5/1960 | Onulak. | |
| 3,288,408 | 11/1966 | Acker | 248/61 |
| 3,556,457 | 1/1971 | Patnaude | 248/499 |

FOREIGN PATENT DOCUMENTS

| 187818 | 1/1956 | Austria. |
|---|---|---|
| 2011889 | 3/1970 | Fed. Rep. of Germany. |
| 2139871 | 3/1972 | Fed. Rep. of Germany. |
| 644997 | 10/1928 | France. |
| 794282 | 2/1936 | France. |
| 969870 | 12/1950 | France. |

Primary Examiner—Lowell A. Larson
Attorney, Agent, or Firm—Pennie & Edmonds

[57] ABSTRACT

A stamped yoke end and a method of making the same where the yoke end has a flat stamped center piece. A tab is cut out of the center piece to form a slot and the tab is bent to one side of the slot to form a lever engaging surface having a section of constant radius.

4 Claims, 4 Drawing Figures

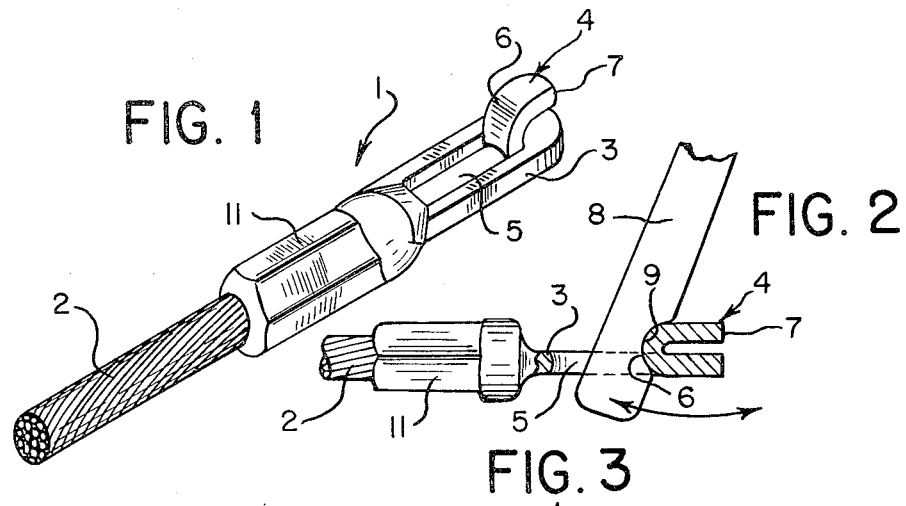
FIG. 1
FIG. 2
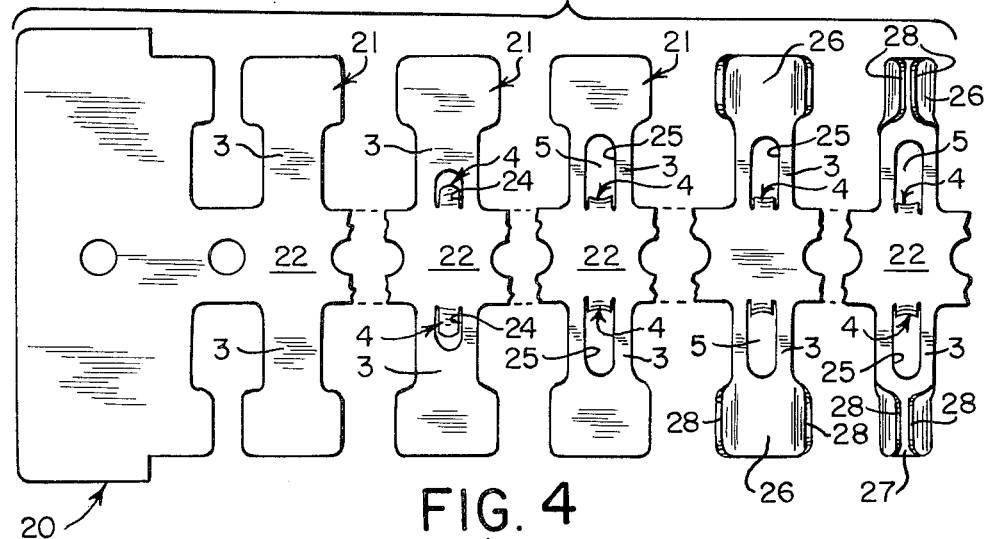
FIG. 3
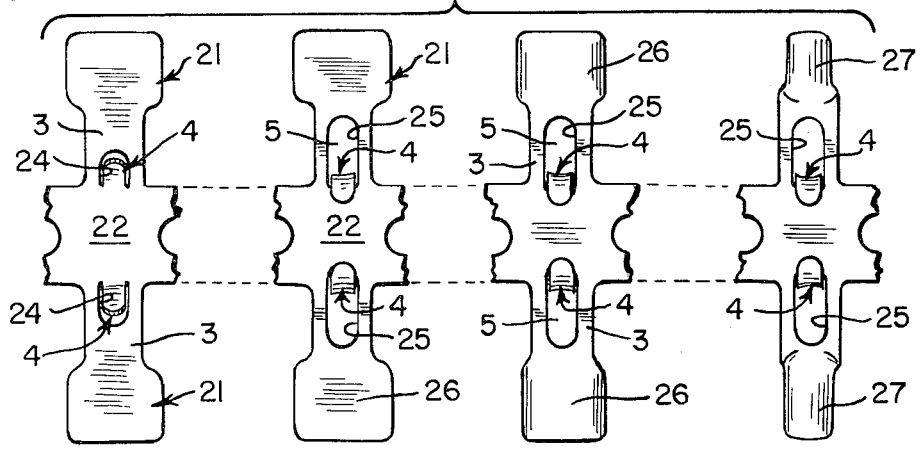
FIG. 4

STAMPED YOKE END AND METHOD OF MAKING SAME

FIELD OF THE INVENTION

This invention relates to a stamped yoke end adapted to engage with a pivotal lever arm and the method of making the same where the yoke end includes a tab a surface of which has a section of constant radius.

BACKGROUND OF THE INVENTION

A yoke end has been used for connecting the end of a control cable to a pivotal lever arm where the yoke end has comprised a body piece including a slot therein through which a lever arm is adapted to extend. One end of the slot adapted to engage the lever arm is curved in an attempt to provide for a smooth engagement between the body piece and the lever arm throughout various degrees of pivotal movement of the lever arm. The yoke has included a generally cylindrical cable connector portion which is swagged onto a cable end to provide for a permanent connection between the yoke end and the cable. Such prior yokes have been formed by relatively expensive hot or cold forging procedures. The yokes so produced have been relatively heavy and large. Further the curved end of the slot included in prior forged yokes has not been a part of a true circle so as to include a section of constant radius which is important to assure that there is a smooth engagement between the yoke and the lever arm as the lever arm pivots. This latter feature is particularly important when the control cable and lever arm form part of an automotive braking system and where movement of the control cable must produce smooth even movement of the lever arm. It is a further important feature in automotive design, and particularly in newer compact automobiles, that the parts making up the brake assembly be small in size since space is limited.

Further it is important that the parts making up the brake assembly be light in weight and at the same time be inexpensive to manufacture.

It is therefore an object of my invention to provide for a yoke end which is compact, relatively light, which will have a lever engaging surface including a section of constant radius and which at the same time will be inexpensive to manufacture.

GENERAL DESCRIPTION OF THE INVENTION

Broadly a yoke end constructed according to my invention comprises a flat stamped body piece which has a tab cut from the inner area of the body piece. The tab is bent to one side of the body piece so as to form a slot within the body piece and so that a surface of the tab facing the slot has a section of constant radius. The tab is bent until the end portion of the tab is substantially parallel to and spaced from the body piece. Preferably the slot is enlarged by cutting additional portions of the body piece opposite the tab to form an elongated slot through which a lever arm is adapted to extend.

When the yoke is to be attached to a cable end, the body piece in addition has a cylindrical portion joined thereto which is at the end of the body piece opposite the tab and where the cylindrical portion is adapted to be fixed to the cable end.

The method of making the stamped yoke end comprises the step of cutting a flat strip into a plurality of flat blanks including a flat body piece where each body piece is connected at one end to a central part of the strip, the step of cutting a tab from the interior of the body piece near where the body piece is connected to the central part of the strip, the step of progressively bending the tab towards the central part of the strip until an end of the tab is substantially parallel to and spaced from the body piece so that a surface of the tab includes a section having a constant radius and the step of cutting the body piece from the central part of the strip.

Preferably the method of forming the stamped yoke end includes the additional step of enlarging each slot by cutting away a portion of each body piece opposite the tab so as to form an elongated slot.

In addition in those instances where the stamped yoke end is to be attached to a cable end, the method includes the additional step of progressively bending the ends of each blank opposite the end of the body piece connected to the central part of the strip so as to form a cylindrical portion which is adapted to be connected to the end of a cable.

BRIEF DESCRIPTION OF THE DRAWINGS

FIG. 1 is a perspective view of a yoke end constructed according to the invention attached to an end of a cable;

FIG. 2 is a partial sectional side view of the yoke end of FIG. 1 shown in engagement with a lever arm;

FIG. 3 is a broken plan view of a strip illustrating a stamped yoke end constructed according to the invention during various stages of formation; and FIG. 4 is a broken bottom view of part of the strip of FIG. 3.

BEST MODE FOR CARRYING OUT THE INVENTION

Referring to FIG. 1 there is illustrated a stamped yoke end 1 constructed according to the invention attached to the end of a cable 2. The stamped yoke end comprises a flat stamped body piece 3 having a tab 4 cut from the inner area of the body piece to form a longitudinally extending slot 5 in the form of a quadrangle. The tab 4 is bent to one side of the body piece such that the surface 6 which faces the slot 5 has a section of constant radius as shown in FIG. 2.

The end 7 of the tab as shown in FIG. 2 is spaced from and parallel to the body piece 3. As shown, the surface 6 is adapted to engage a lever arm 8 which has a curved engaging surface 9 complimentary to the surface 6. Since the surface 6 has a section of constant radius and since the surface 9 compliments the surface 6, there will be a continual even engagement between the surfaces 6 and 9 throughout a limited range of pivotal movement of the arm 8.

The stamped yoke end includes in addition a cylindrical portion 11 which joins the flat body piece at the end of the slot opposite the tab 4. The cylindrical portion 11 is adapted to be swagged onto the end of the cable 2 to form a tight permanent connection between the yoke end and the cable.

Referring to FIGS. 3 and 4 there is illustrated a flat strip 20 from which a plurality of flat blanks 21 including flat body pieces 3 are cut by conventional cutting tools. The tab 4 is initially cut in the end of the flat body piece 3 adjacent the center portion 22 of the strip and is progressively bent back through a series of bending stations until the end of the tab is parallel to and spaced from the body piece 3 as shown in FIG. 2. As the tab is initially cut and bent, it will form a slot 24. In order that the slot may be of said sufficient size so as to readily receive an end of an arm 8, an additional portion 25 of the slot opposite the tab 4 is cut so as to form the elongated slot 5.

The portions 26 of the flat blanks 21 positioned farthest from the center portion 22 of the strip are progressively bent through a series of forming stations into a cylindrical portion 27. The flat body piece 3 is then cut from the stamping.

The ends 28 of the cylindrical portion are then brazed together after which the stamped yoke is subjected to a hardening process. The yoke is then ready to be attached to the cable end by swagging. As shown in FIG. 3, the width of the portion 26 which becomes the inner circumference of the cylindrical portion 27 is greater than the width of the slot 5.

While the yoke end as shown is adapted for connection to a cable end, it is obvious that a yoke end according to the invention could comprise the flat body piece 3 having two tabs cut therefrom to form a single slot with a tab at each end of the slot and where each tab has surfaces including a section of constant radius. Such a yoke end could then be utilized to act as a linkage between two pivotal lever arms.

A stamped yoke end produced according to the invention is comparatively inexpensive to manufacture since cutting processes are utilized in the manufacture rather than forging procedures. The stamped yoke has the advantage over forged yokes in that it is lighter, smaller, costs less to manufacture and in that the lever arm engaging surfaces include sections of constant radius.

I claim:

1. A stamped yoke end adapted to engage a lever arm, said yoke end comprising a flat stamped body piece having a tab cut from the inner area of the body piece to form a longitudinally extending rectangular slot in the body piece with the tab being bent to one side of said body piece wherein the end of the tab is spaced from and substantially parallel to said body piece and so that the surface of the tab adjacent a narrow end of the slot facing the slot forms a circular lever arm engaging surface having a section of constant radius with the longitudinal axis of the slot bisecting said tab, and a cylindrical portion adjoining said flat stamped body piece at the end of the slot opposite said tab where the circumference of the inner surface of the cylindrical portion is greater than the width of the slot and where the cylindrical portion extends parallel to said longitudinally extending slot.

2. A method of making stamped yoke ends from a flat strip comprising the step of cutting said strip into a plurality of flat blanks including flat body pieces each connected at one end to a central part of the strip, the step of cutting a tab from the end of each body piece connected to the central part of the strip, the step of progressively bending each tab towards the center part of the strip until an end portion of the tab is parallel to and spaced from its body piece and so as to form a longitudinally extending slot in the shape of a quadrangle in the body piece with the longitudinal axis of the slot bisecting said tab and with a portion of the tab forming a circular lever arm engaging surface adjacent a narrow end of the slot having a section of constant radius, and the step of cutting each body piece from the central part of the strip.

3. A method of making stamped yoke ends according to claim 2 including the additional step of enlarging each said slot by cutting away a portion of each body piece opposite a tab to form an elongated slot in each body piece adapted to receive a lever arm.

4. A method of making stamped yoke ends according to claim 3 including the additional step of progressively bending the end of each blank opposite the end of the body piece connected to the center part of the strip to form a cylindrical portion adapted to be connected to the end of a cable.

* * * * *